United States Patent [19]

Freeman et al.

[11] Patent Number: 4,468,306

[45] Date of Patent: Aug. 28, 1984

[54] BIODIC ELECTROFILTRATION

[75] Inventors: Mark P. Freeman, Darien; Peter R. Klinkowski, Norwalk, both of Conn.

[73] Assignee: Dorr-Oliver Incorporated, Stamford, Conn.

[21] Appl. No.: 482,488

[22] Filed: Apr. 6, 1983

[51] Int. Cl.³ .................... B01D 57/02; B01D 13/02
[52] U.S. Cl. .................... 204/180 P; 204/301; 204/152
[58] Field of Search ............ 204/180 R, 180 P, 152, 204/299, 301

[56] References Cited

U.S. PATENT DOCUMENTS 4,132,626  1/1979  Kunkle ..................... 204/180 R
4,168,222  9/1979  Freeman .................. 204/180 R Primary Examiner—John F. Niebling
Attorney, Agent, or Firm—Harold M. Snyder; Burtsell J. Kearns

[57] ABSTRACT

An electrically augmented vacuum filtration apparatus and process wherein a suspension of solids is dewatered in a bath located between electrodes of opposite polarity with intermediate biodes (a biode being in a sense a combined anode and cathode structure) positioned in the bath between the electrodes.

12 Claims, 1 Drawing Figure

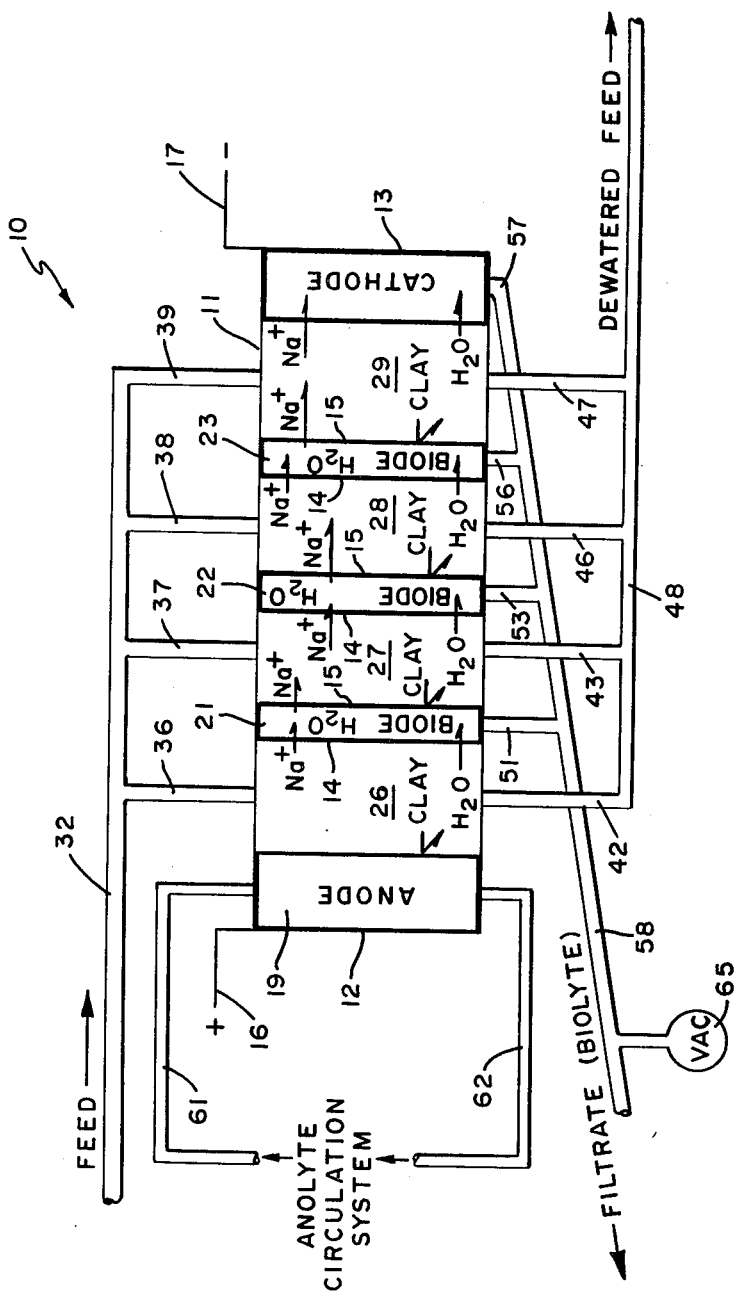

BIODIC ELECTROFILTRATION

The present invention is directed to a biodic electrofiltration apparatus for electrically augmented vacuum filtration and to a process for utilizing that apparatus in dewatering a suspension of solids.

BACKGROUND OF THE INVENTION

Electrically augmented vacuum processes and apparatuses for carrying out dewatering of suspensions are disclosed in U.S. Pat. No. 4,107,026, issued Aug. 15, 1978, U.S. Pat. No. 4,168,222, issued Sept. 18, 1979, U.S. Pat. No. 4,170,529, issued Oct. 9, 1979, U.S. Pat. No. 4,207,158, issued June 10, 1980 and copending applications, U.S. Ser. No. 109,931, filed Jan. 4, 1980 and U.S. Ser. No. 285,196, filed July 20, 1981. The entire disclosures of these patents and applications are incorporated herein by reference thereto.

In these earlier disclosures, self-contained hollow electrode assemblies are provided which are normally submerged in the suspension, but allow bodily removal therefrom for inspection or other purposes. These hollow electrode assemblies comprise two types of wall surfaces: ion-pervious walls for electrode assemblies of one polarity and liquid-pervious walls for electrode assemblies of the opposite polarity. The wall surfaces of the electrode assemblies comprise chemically and electrically neutral filter media, an ion exchange membrane or a permeable porous membrane, backed by a supporting grid, thus presenting a planar electrode surface.

In operation, with electrode assemblies of both types immersed in the suspension, a source of vacuum is connected to the interior of the electrode assemblies having liquid-pervious walls to provide a controllable pressure differential, thereby producing a flow of carrier liquid through the filtration surfaces, while the solids migrate in the opposite direction, under the influence of the electric field, to deposit as cake upon the electrode assemblies having ion-pervious walls. Filtrate or permeate liquid, that is, carrier liquid freed of solids, is withdrawn or pumped from the interior of the liquid-filled hollow electrode structure at a controllable rate.

As indicated, cake deposition occurs on the hollow electrode assemblies having ion-pervious surfaces; these electrode assemblies are filled with an electrolyte and have an electrode element therein immersed in the electrolyte. These electrode elements are thus isolated from direct contact with the suspension. The electrolyte is specially selected for high conductivity and compatibility with the electrode element. By compatibility is meant the relatively non-corrosive character of the electrolyte relative to the electrode element under the conditions that ordinarily prevail within the hollow electrode assembly. Since decomposition or evolution products and heat are generated at the electrode element within the hollow ion-pervious assembly, provision is made for a flow of electrolyte into and through the electrode chamber so that foreign products, including gases, and heat are swept out of the chamber and a relatively constant predetermined electrolyte composition is maintained.

The ion-pervious wall of the electrode assembly in these prior art structures comprises a chemically and electrically neutral filter medium, ion exchange membrane, or permeable porous membrane which, if film-like in nature or otherwise requiring support, may be backed by a chemically and electrically neutral grid so that a planar electrode wall surface is presented to the slurry being treated. Since the cake will form on this electrode during electrofiltration and must be removed by contact with doctoring blades, a friction cage or spacing means may be provided to protect the relatively fragile wall surface from direct contact with the doctoring blades. The friction cage comprises a thin, open screenwork of relatively hard material covering the wall surface of the electrode assembly for contact with the doctoring blades while spacing means may comprise strips of plastic materials, such as Delrin acetal resin arranged in a frame-like configuration and of a thickness sufficient to prevent contact between the doctor blade and the wall surface. For the purpose of cake recovery, the electrode assembly is raised to a position of emergence from the suspension, with the layer of collected solids or cake layer adhering thereto. Since the electrolyte remains within the electrode assembly in the raised position, a vacuum is applied internally of the electrode to reduce the pressure and so prevent rupture or distortion of the assembly walls. When the electrode assembly is immersed in operation, the vacuum applied internally serves to help remove gaseous products, such as chlorine, oxygen or carbon dioxide, evolved at the electrode element.

As described above, a plurality of electrode assemblies are immersed in a bath, arranged so that electrode assemblies of one polarity alternate with electrode assemblies of the opposite polarity; electrode assemblies of like polarity being electrically connected in parallel. With this arrangement a plurality of anodes and cathodes with their electrical connections must be provided and special and expensive structures such as electrode elements and equipment for circulating electrolyte must be provided for each such anode or cathode.

Accordingly, a need exists for an electrofiltration apparatus which does not require the multiple, complex structures of the present commercial apparatus.

SUMMARY OF THE INVENTION

In accordance with this invention, an electrofiltration apparatus is provided wherein electrode assemblies and intermediate electrode-like elements (biodes) operate in series to dewater a suspension of solids. The biodes are not directly connected to the external electric circuit. One wall or face of each biode is an ion-pervious membrane while a second wall or face is a liquid-pervious filter medium.

The walls of the biode assume a polarity opposite to that of the electrode they face. Thus, the biode, in operation, has one positive face and one negative face. Solids from the suspension deposit on the ion-pervious wall, while carrier liquid from the suspension passes through the liquid-pervious filter medium into the biode chamber. This biolyte is withdrawn from the biode as the dewatering of the suspension proceeds and may be disposed of. The solids cake deposited on the biodes may be removed (by doctor blades or otherwise) from the biodes and recovered.

More particularly, the electrically augmented vacuum filtration apparatus of the invention comprises a tank for holding a bath of solids in suspension, a pair of spaced electrode structures immersed in the suspension and connected to an external electric circuit for establishing an electrical potential between the electrode structures, at least one biode immersed in the suspension intermediate to the electrode structures, the biode comprising a chamber with one wall thereof composed of an ion-pervious member or membrane which faces one of the electrode structures while a second wall of the biode chamber is composed of a liquid-pervious filter medium and faces the other electrode structure. When an electrical potential is established in the bath by means of the electrode structures, the ion-pervious member and the filter medium forming the chamber walls or faces of the biode assume a polarity opposite to that of the electrode structure they are facing. The biode is not connected to the external electric circuit. A source of vacuum is connected to the biode chamber to facilitate permeation of carrier liquid from the bath through the liquid-pervious filter medium into the biode chamber. The ion-pervious member or membrane of the biode chamber facilitates transport of certain ions through the apparatus and provides a surface to which solids from the bath are attracted. At least some solids may be deposited on the ion-pervious wall member as a cake. In some cases, the cake accumulated on the biodes is the product of the process, while in other cases cake deposition is limited and the product of the process is a slurry having a substantially higher concentration of solids than the feed slurry.

DESCRIPTION OF THE DRAWING

The drawing is a schematic illustration of the biode electrofiltration apparatus of the present invention as applied to a dispersed material with negative surface charge.

DETAILED DESCRIPTION

Referring to the drawing, there is illustrated a biodic electrofiltration apparatus 10 including a tank 11 for containing a suspension of solids to be dewatered, an anode assembly 12 and cathode assembly 13 immersed in the suspension at opposite ends of tank 11, with appropriate connections 16, 17 to an external electric power source. A plurality of biodes 21, 22, 23 are immersed in the suspension and positioned intermediate anode assembly 12 and cathode assembly 13. The biodes 21, 22, 23 are not themselves directly connected to the external power source and are spaced from each other and from anode 12 and cathode 13 by bath compartments 26, 27, 28, 29. A feed header 32 supplies a feed, such as a clay slurry, to a plurality of feed inlet conduits 36, 37, 38, 39 by means of which the feed is introduced into bath compartments 26, 27, 28, 29, respectively. Dewatered slurry is removed from bath compartments 26, 27, 28, 29 by a plurality of slurry conduits 42, 43, 46, 47 which communicate with a main slurry conduit 48. If the process, however, is one in which the solids in the feed slurry are deposited as cake on, and recovered from, the anodic surfaces or faces of the anode and biodes, the slurry conduits 42, 43, 46, 47 function as overflow lines to remove bath suspension of depleted solids content. Biolyte is withdrawn from biodes 21, 22, 23 and filtrate from cathode 13 by a plurality of outlet conduits 51, 53, 56, 57 which are manifolded with main outlet conduit 58. Vacuum means 65 is connected to main outlet conduit 58 so that vacuum filtration occurs at the cathode 13 and at the cathodic faces 14 of the biodes.

The anode 12 may be of the protected anode type disclosed in the above-cited U.S. Pat. No. 4,168,222 and so require an anolyte circulation system indicated by anolyte conduits 61, 62 which provide fresh anolyte to chamber 19 of anode 12.

In operation, a feed slurry is introduced into bath compartments 26, 27, 28, 29 of tank 11 through feed header 32 and feed inlet conduits 36, 37, 38, 39. The anolyte circulation system is initiated (if the anode is so provided) and anolyte circulates through anode 12 and conduits 61 and 62. The electrical power source is actuated, establishing an electrical potential across the bath in tank 11. Vacuum means 65 is also actuated, thereby applying vacuum to biodes 21, 22, 23 so that liquid from bath compartments 26, 27, 28 and 29 begins to flow through the cathode and the cathode faces 14 of the biodes.

For illustrative purposes, the solids of the slurry in bath compartments 26, 27, 28, 29 have a negative charge (for example, a clay slurry) and are consequently attracted to the anode assembly 12 (from bath compartment 26) and to the anode faces 15 of the biodes 21, 22, 23. Both the anodic and cathodic faces of the biodes are impermeable to the solid particles and these particles are either deposited on the anodic faces of the biodes or, if the bath cross-flow across the anodic faces is of sufficient velocity, are swept out of the bath compartments in a thickened product stream. In the situation where a cake of solids is deposited on the anode assembly and the anodic faces of the biodes, means may be provided to raise the anode assembly and biodes out of the bath so that the cake may be removed by a doctor blade and recovered. Means for accomplishing this cake recovery operation is disclosed in U.S. Pat. No. 4,107,026, referred to above.

One face of the biode (say the anodic face 15) may be composed of an ion exchange member (for example, Nafion membrane—a DuPont product—or the solid polymeric electrolyte disclosed in copending application Ser. No. 285,196, filed July 20, 1981) which, in the case of the exemplary members, would facilitate cation transport and exclude anion transport.

The cathodic face 14 of the biode may be composed of a fabric filter medium made from Dynel (a trademark of Union Carbide Company for a copolymer of vinyl chloride and acrylonitrile) fibers.

It should be noted that if the suspended particles in the bath have a positive surface charge, the process is reversed and the anode and anode faces of the biodes will be outfitted with filter media, while the cathode and cathodic faces of the biodes will be fitted with ion pervious media.

It will be understood that the biolyte will contain water and certain ions when a clay slurry is being treated.

However, it has been found that the biolyte from the biode electrofiltration process is cleaner than the filtrate from a conventional electrofilter. Typical values are:

|  | Filtrate | Biolyte |
| --- | --- | --- |
| pH | 11+ | 7 |
| Conductivity (micromhos) | 15,000 | 200–1,000 |

Thus, environmentally acceptable disposal of large amounts of filtrate represents a substantial problem, whereas the essentially neutral biolyte constitutes a discharge having minimal pollution consequences.

Under some circumstances, it may be necessary to increase the conductivity of the biolyte by introducing additional ions, for example, NaCl, into the biolyte. In general, the biodes should be relatively thin to minimize the effect of the low conductivity of the biolyte.

It is also contemplated that the faces of the biode may be made from microporous or ultrafiltration membranes. The particular filter medium provided will depend upon the characteristics of the feed and the desired product.

The biode system disclosed hereinbefore has the very real advantage that the multiple electrode elements necessary in the prior art structure are not required in the biodes. These electrode elements are typically very costly and extraordinary means are frequently resorted to in order to prevent these electrodes from anodizing. For example, certain electrode elements have been fabricated from titanium metal and coated with one of the platinum metals.

It is expressly understood that the present invention is not limited to the embodiment illustrated and described. Various changes can be made in the design and arrangement of parts without departing from the spirit and scope of the invention as the same will now be understood by those skilled in the art.

We claim:

1. An electrically augmented vacuum filtration apparatus comprising a tank for holding a bath of solids in suspension, said tank having inlet and outlet means, a pair of spaced electrode structures immersed in said suspension and connected to an external electric circuit for establishing an electrical potential between said electrode structures, at least one biode immersed in said suspension intermediate said electrode structures, said biode comprising a chamber having one wall thereof composed of an ion-pervious member facing one of said electrode structures, a second wall of said biode composed of a liquid-pervious filter medium facing the other of said electrode structures, the ion-pervious member and the filter medium forming the chamber walls of the biode being characterized by a polarity opposite to that of the electrode structure they are facing when an electrical potential is imposed by the electrode structures, said biode having no direct connection to the external electric circuit, vacuum means communicating with the interior of the biode chamber to facilitate permeation of carrier liquid from the bath through the liquid-pervious filter medium into the biode chamber and means for withdrawing such biolyte liquid from said biode chamber, said ion-pervious member facilitating transport of certain ions through the apparatus and providing a surface on which solids from the bath may be deposited, said chamber walls separating the biolyte liquid within said biode from the suspension in which the biode is immersed.

2. The electrically augmented vacuum filtration apparatus of claim 1 wherein the anode structure of said electrode structures is provided with an ion-pervious wall and an electrode element located within said anode structure immersed in a circulating, protective electrolyte.

3. The electrically augmented vacuum filtration apparatus of claim 2 wherein the ion-pervious wall of said biode faces said cathode and is consequently an anodic surface.

4. The electrically augmented vacuum filtration apparatus of claim 3 wherein the liquid-pervious wall of said biode faces said anode and is consequently a cathodic surface.

5. The electrically augmented vacuum filtration apparatus of claim 4 wherein a plurality of biodes are provided and means are provided to doctor and recover the cake deposited on said ion-pervious walls of said anode and biodes.

6. The electrically augmented vacuum filtration apparatus of claim 4 wherein said ion-pervious wall is an ion exchange membrane.

7. The electrically augmented vacuum filtration apparatus of claim 4 wherein said liquid-pervious filter medium is a fabric composed of a copolymer of vinyl chloride and acrylonitrile.

8. The electrically augmented vacuum filtration apparatus of claim 4 wherein said liquid-pervious filter medium is a microporous or ultrafiltration membrane.

9. A method for dewatering a suspension of solids by passing said suspension into an array of electrodes and biodes arranged in a series electrical circuit, energizing the electrodes to establish an electrical potential across said suspension and thereby conferring anodic and cathodic properties to opposite faces of each biode, withdrawing and disposing of biolyte from said biodes and recovering solids deposited on the faces of said biodes.

10. The method of claim 9 wherein the solids are deposited on and recovered from the anodic faces of said biodes.

11. The method of claim 9 wherein the solids are deposited on and recovered from the cathodic faces of said biodes.

12. A method for dewatering a suspension of solids by passing said suspension through an array of electrodes and biodes arranged in a series electrical circuit, energizing the electrodes to establish an electrical potential across said suspension thereby conferring anodic and cathodic properties to opposite sides of each biode, withdrawing biolyte from said biodes, maintaining a sufficient velocity of said suspension past said array of electrodes and biodes to limit deposition of solids on any anode or anodic side of said biodes and withdrawing the suspension after passing through the array of electrodes and biodes as a thickened product slurry.

* * * * *